United States Patent [19]
Evans

[11] 3,947,043
[45] Mar. 30, 1976

[54] RECORD PLAYER

[75] Inventor: Philip Henry Evans, Stourbridge, England

[73] Assignee: Glenburn Engineering (U.K.) Limited, England

[22] Filed: July 12, 1974

[21] Appl. No.: 487,891

[30] Foreign Application Priority Data
July 19, 1973 United Kingdom............... 34504/73

[52] U.S. Cl.............................................. 274/10 R
[51] Int. Cl.$^2$......................................... G11B 15/00
[58] Field of Search.................................. 274/10 R

[56] References Cited
UNITED STATES PATENTS

| | | | |
|---|---|---|---|
| 3,762,722 | 10/1973 | Tajime.............................. | 274/10 S |
| 3,820,797 | 6/1974 | Suzuki.............................. | 274/10 S |

*Primary Examiner*—Harry N. Haroian
*Attorney, Agent, or Firm*—Klarquist, Sparkman, Campbell, Leigh, Hall & Whinston

[57] ABSTRACT

An automatic record player for playing disc records of different sizes including a mechanism for raising and lowering and pivoting upwardly and downwardly the pick-up arm at the end of playing of a record and including a switch-off means to switch off the record player when all the records carried on the centre spindle have been played, the switch-off means including a trip latch movable from a first to a second position in dependence upon the resistance to movement of the control member of the centre spindle, the resistance being determined by the presence of at least a predetermined number of records on the spindle and the trip latch being effective in the first position to permit continued operation of the record player and being effective in the second position to actuate the switch-off means to switch off the record player.

5 Claims, 14 Drawing Figures

RECORD PLAYER

BACKGROUND OF THE INVENTION

1. Field of the Invention

This invention relates to an automatic record player for playing disc records of the type, hereinafter referred to as the type specified, comprising a deck plate, a turntable rotatably mounted on the deck plate and driven in use, by an electric motor, a centre spindle extending upwardly from the centre of the turntable to support a stack of records above the turntable and from which records are fed singly in succession from the bottom of the stack on to the turntable and a pick-up arm, pivotally mounted for movement about a horizontal axis on the upper end of a vertical spindle, the vertical spindle being pivotally mounted for movement about a vertical axis relative to the deck plate, a drive gear rotatably mounted on the deck plate, and means for rotating the drive gear during a record changing cycle, after playing a record, which includes pivoting the pick-up arm about said horizontal axis to raise the pick-up arm to disengage the pick-up from the record, then pivoting the vertical spindle to swing the pick-up arm outwardly to a position clear of the path of downward movement of the next record to be played, then releasing the lowermost record from the stack to drop onto the turntable, then pivoting the vertical spindle about said vertical axis to swing the pick-up arm inwardly to position the pick-up over the edge of the record to be played and then pivoting the pick-up arm to engage the pick-up with the record.

2. Summary of the Invention

An object of the present invention is to provide a new or improved record player of the type specified, and including means to automatically switch off the record player.

According to the present invention we provide an automatic record player for playing disc records of different sizes comprising a deck plate, a motor, a turntable rotatable on the deck plate and driven, in use, by the motor, a centre spindle extending upwardly from the centre of the turntable, a control member movable within the center spindle to cause records to be fed singly in succession from the bottom of a stack supported on the spindle on to the turntable, a pick-up arm pivotally mounted for movement above a horizontal axis on the upper end of a vertical spindle, the vertical spindle being pivotally mounted for movement about a vertical axis relative to the deck plate, a drive gear rotatably mounted on the deck plate, means for rotating the drive gear by the motor during a record changing cycle, record change means driven from the drive gear to move the control member and to cause pivotal movement of the pick-up arm about said horizontal axis and of said vertical spindle about said vertical axis, a selector plate provided at the lower end of the vertical spindle, a selector latch mounted on the deck plate, the selector plate and latch having selectively interengageable abutments and the selector latch being movable, by said record change means, from a first position, in which free movement of the selector plate is permitted, into a second position for inter-engagement between desired abutments to limit pivotal movement of the selector plate, switch-off means to switch-off the record player, actuating means to actuate and switch-off means comprising a trip latch movable from a first to a second position in dependence upon the resistance to movement of the control member of the centre spindle, the resistance being determined by the presence of at least a predetermined number of records on the spindle, a cut-out latch mounted on the selector latch for movement relative thereto, a trip element, operated when the trip latch is in said second position, to position the selector latch in a third position so that during a last record changing cycle at the end of playing the last record said cut-out latch is in position for engagement with an abutment portion of the record change means so that movement of the abutment portion displaces the cut-out latch so that a portion thereof is moved into position to actuate the switch-off means when the selector latch is moved to said first position by said record change means.

The centre spindle may be an umbrella type spindle.

In this specification the term "umbrella spindle" is intended to mean a centre spindle comprising an elongate body, adapted at its one, lower end to be fitted to a record player, having a record supporting means movable to an extended position to support a stack of records and a retracted position allowing the lowermost, or the last, record of the stack to descend along the spindle and record retaining means movable between an extended position temporarily to support the remainder of the stack during descent of the lowermost record thereof and a retracted position to permit free passage of records along the spindle.

Preferably the centre spindle is as described in our co-pending British application No. 3373/72, Cognate No. 16498/72.

BRIEF DESCRIPTION OF THE DRAWINGS

One embodiment of the present invention will now be described by way of example with reference to the accompanying drawings wherein.

DESCRIPTION OF THE PREFERRED EMBODIMENT

Figure 1A:
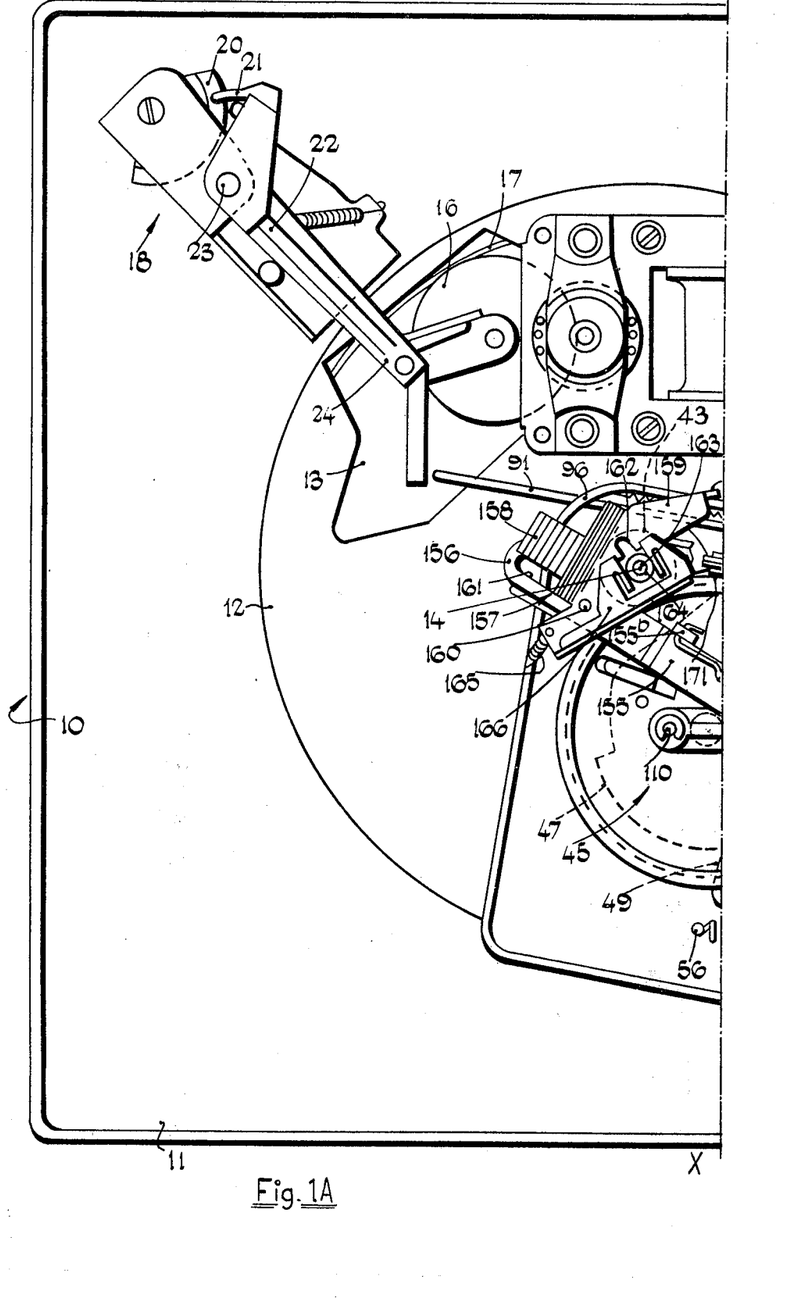
FIG. 1A is an underneath plan view showing part of a record player embodying the invention to the left of the line X—X in FIG. 1A.
Figure 1B:
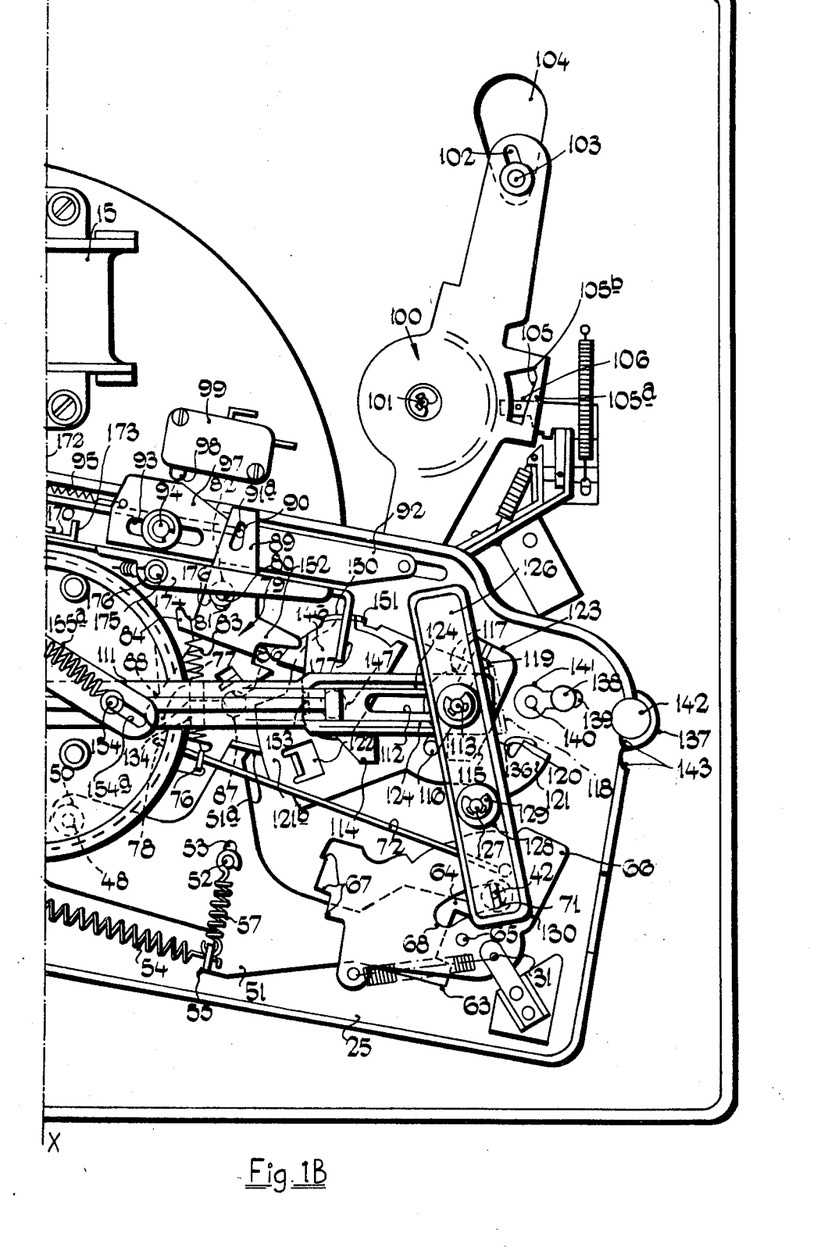
FIG. 1B is an underneath plan view showing part of a record player embodying the invention to the right of the line X—X in FIG. 1A.
Figure 12:
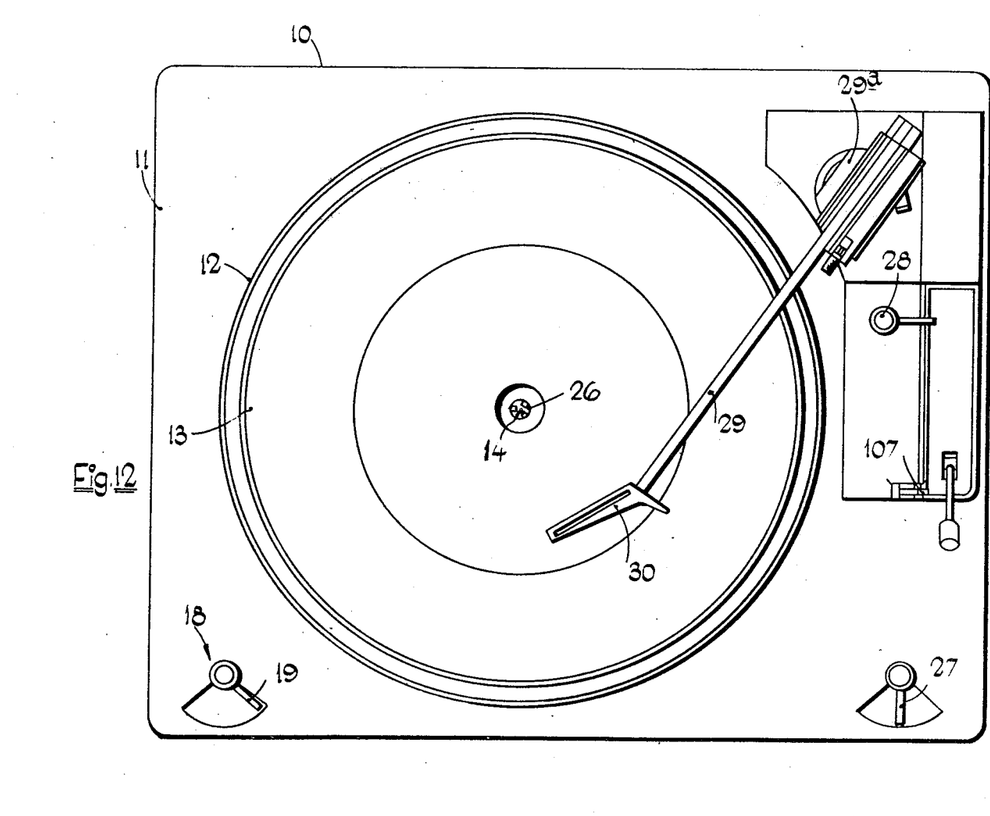
FIG. 12 is a plan view of the record player shown in FIGS. 1A to 11.

Referring to the Figures, particularly FIGS. 1A and 1B, and 12, a record player is indicated generally at 10 and comprises a deck plate 11 having a circular well 12 formed therein within which a turntable 13 is rotatably mounted in a bearing provided in a die cast mounting casting fixed to the underside of the base plate, the turntable being rotatable about a vertical axis 14 and driven by means of an electric motor 15 in conventional manner by means of a jockey pulley 16 interposed between the rim of the turntable and a stepped spindle not shown, of the motor.

Record speed change means 18 are provided to permit the speed of rotation of the turntable to be adjusted to any one of the usual three desired speeds, namely 78 rpm., 45 rpm., and 33⅓ rpm. and a variable pitch device may be provided to permit fine adjustment of the speed if desired. The record speed change mechanism 18 comprises a hand engageable member 19 connected to a rotary cam member 20 which engages one end 21 of a two-armed lever 22 pivotally and slidably mounted on the deck plate 11, as indicated at 23. The other end 24 of the lever 23 carries the jockey pulley 16.

As the hand engageable member 19 is rotated the cam member 20 causes the two-armed lever 22 to be moved vertically up and down so that the jockey pulley 16 can be engaged with a desired one of the steps on the stepped motor spindle. In addition, as the two-armed lever 22 is moved between the steps on the spindle both in an upward and in a downward direction the lever 22 is rotated to lift the jockey pulley 16 out of engagement with the spindle.

A sub-plate 25 is mounted beneath the deck plate 11 and an umbrella type centre spindle 26 as described in our co-pending applications Nos. 3373/73 and 16498/73 is provided in the centre of the turntable 13 to support a stack of records thereon in conventional manner.

The deck plate 11 is provided with a manually operable "on/off" lever 27 and a manually operable record size selector lever 28. A pick-up arm 29 carrying a pick-up head 30 is pivotally mounted on the upper end of a vertical spindle 31 for up and down movement about a horizontal axis and the vertical spindle 31 is mounted on the deck plate 11 for movement about a vertical axis to allow swinging movement of the pick-up arm 29 inwardly and outwardly of the turntable 13.

A pick-up arm raising spindle 42 is mounted in an aperture in the sub-plate 25 and in a boss, not shown, on the deck plate for sliding up and down movement in a vertical direction. The upper end of the spindle 42 engages a portion 29a of the pick-up arm 29 so that the pick-up arm is pivoted up and down about its horizontal axis in accordance with up and down movement of the spindle 42.

Figures 2, 2A, 3:
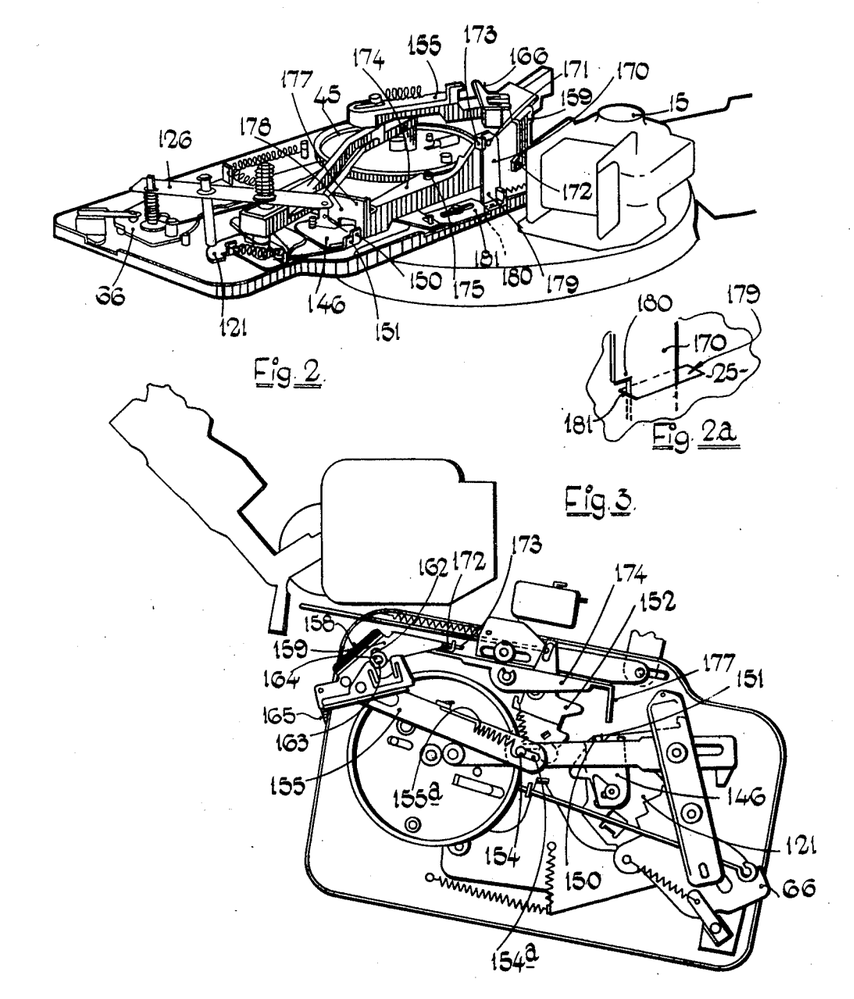
FIG. 2 is a perspective view of the record player of FIGS. 1A and 1B with parts omitted for clarity and illustrating the record player at one stage of a record changing cycle of operations.
FIG. 2a is a fragmentary perspective view to an enlarged scale of part of FIG. 2.
FIG. 3 is an underneath plan view of the record player of FIGS. 1A and 1B showing the record player at a second stage of the record changing cycle.

Referring now particularly to FIGS. 1A, 1B and 2, the turntable 13 has a pinion, not shown, formed integrally therewith, and surrounding the centre spindle 26, and adapted to engage with gear teeth, not shown, provided on a drive gear 45 rotatably mounted on the sub-plate 25. The drive gear 45 has a number of teeth omitted and is provided with a pawl mechanism of conventional form so that when a record changing cycle of operations is desired the pawl is moved into position for engagement by a dog, not shown, provided on the turntable beneath the pinion to initiate rotation of the drive gear 45 and engage the teeth thereon with the pinion. When the drive gear has been rotated through a single revolution the gap in the teeth is again aligned with the pinion and the pawl mechanism has been moved out of position for engagement with the dog and hence the drive gear is rotated through only a single revolution.

The drive gear 45, which is made as a die casting or as a moulding in a suitable plastics material, has formed integrally therewith a radially outwardly facing cam surface 47 and a drive pillar 48 which may be provided with a roller 49 is engaged with the cam surface 47. The cam surface 47 is provided with a recess 50 to act in co-operation with the roller 49 to locate the drive gear in its "at-rest" position, shown in FIGS. 1A, 1B and 2 in which the gap in the teeth is aligned with the pinion.

The drive pillar 48 is carried on a drive lever 51 which is mounted on the underside of the sub-plate 25 by means of a downwardly extending pivot post 52 fixed to the sub-plate 25 and which is engaged within a transversely extending slot 53 formed in the drive lever 51. A coil tension spring 54 is engaged between a down-turned lug 55 on the lever 51 and an aperture 56 provided in the sub-plate 25, in addition, a coil tension spring 57 is engaged between the lug 55 and post 52.

The coil tension spring 54 is provided to rotate the drive lever 51 about the pivot post 52 to provide a drive to the record player pick-up arm in a direction inwardly of the record, as hereinafter to be described, whilst the spring 57 provides an overload arrangement if the pick-up arm is moved forcibly outwardly.

The end of the lever 51 remote from the piller 48 is bifurcated to provide a fork having two limbs 63 and 64 between which is engaged a selector plate drive peg 65 depending downwardly from a selector plate 66.

The selector plate 66 is fixed to the pick-up arm vertical spindle 31 and is of generally conventional form, having three abutment surfaces 67 which are spaced angularly about the axis of pivot of the vertical spindle 31 and are spaced at different radial distances therefrom. A part annular slot 68 is formed in the selector plate 66 to accommodate the pick-up arm raising the spindle 42 and a coil compression spring, not shown, is engaged around the spindle 42 about a circlip, not shown, to act on the selector plate 66 through a washer 71 when the spindle 42 is raised as described hereinafter.

A wire 72 is pivotally connected at one end to a downward extending pin on the selector plate 66 whilst the other end of the wire 72 extends through an aperture formed in a lug 76 in the sub plate 25 so that the wire 72 is guided for sliding movement in its longitudinal direction. The end 77 of the wire 72 is positioned adjacent to the periphery of the drive gear 45 for engagement with the pawl mechanism thereof, as will hereinafter be described.

Also positioned adjacent the periphery of the drive gear 45 to operate on the pawl mechanism thereof is an end portion 78 of one arm 88 of a two-armed cut-off lever 79 pivoted adjacent its mid-point on a pin 80 extending downwardly from the sub-plate 25 and engaged in a slot 81 formed in the lever 79 and held in position thereon by means of a circlip 82. A coil tension spring 83 extends between a lug 84 on the cut-off lever 79 and the lug 76 provided on the sub-plate 25.

An indent part 86 is formed in one edge of the lever 79 for engagement with a pin 87 depending downwardly from the sub-plate 25 and the spring 83 urges the lever 79 in the direction to engage the edge thereof containing the indent part 86 with the pin 87. The other arm 89 of the lever 79 is provided with a slot 90 in which is engaged an end part 91a of a link 91, depending downwardly through a switch slide 92, which itself has a longitudinal extending slot 93 in which is engaged a pin 94 depending downwardly from the deck plate. A coil tension spring 95 extends between the slide 92 and an aperture 96 in an edge flange part of the deck plate. A cam surface 97 is provided on the switch slide 92 to engage the operating member 98 of an electric "on/-off" switch 99.

The other end of the slide 92 is pivotally connected to a switch-off level 100 which is pivotally mounted on the deck plate adjacent its mid-point by a pivot pin 101. The opposite end of the switch-off lever 100 has an inclined slot 102 formed therein in which is engaged a pin 103 fixed to an "on/off" reject plate 104 pivotally mounted on the deck plate and having the hereinbefore mentioned "on/off" lever 27 mounted thereon on the top side of the deck plate 11.

The switch-off lever 100 has a cam track 105 provided thereon with which is engaged the lower end 106 of a pick-up arm rest clamp lever 107.

The drive gear 45 carries a pin 110 which pivotally connects one end of a drive link 111 thereto. At its other end the drive link 111 is provided with a longitudinally extending slot 112 within which a selector control pivot post 113 is received.

The link 111 is made as a moulding in a suitable synthetic plastics material and has formed integrally therewith a pair of lugs 114 and 115 spaced apart in the longitudinal direction of the link. The lugs 114 and 115 are provided to alternatively engage with a pin 116 moulded integrally with a selector latch drive moulding 117 also made of synthetic plastics material and rotatably mounted on the post 113. A coil tension spring 118 is connected between a part 119 of the selector drive latch moulding and a lug 120 formed integrally on a selector latch 121 which is also mounted for pivotal movement about the post 113, and which is provided with a lug 122 for engagement with one of the abutment surfaces 67 of the selector plate 66, as hereinafter to be described in more detail. The selector latch 121 has an abutment 123 for engagement with the part 119 of the selector latch drive moulding 117.

Figure 10:
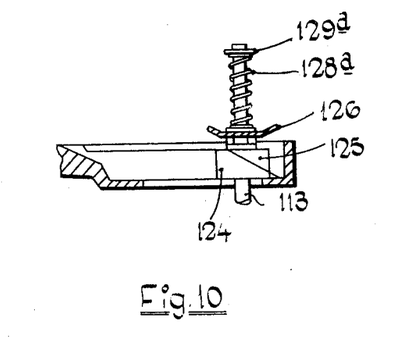
FIG. 10 is a fragmentary cross-sectional view showing part of the record player during the first part of the cycle.
Figure 11:
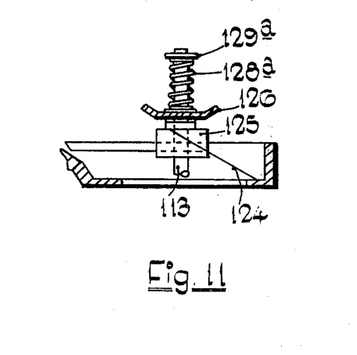
FIG. 11 is a similar view to FIG. 10 showing a later stage of the first part of the cycle.

The underside of the portion of the drive link 111 adjacent the selector control pivot post 133 is provided with a pair of longitudinally extending ramp surfaces 124 which are inclined upwards to diminish in height towards the free end of the drive link 111. The ramp surfaces 124 have engaged therebetween a shouldered bush 125 see FIGS. 10 – 11, on the post 113 whereby the shoulder of the bush 125 lies under the ramp surfaces 124. The shouldered portion lies above a transfer lever 126 which is pivoted adjacent its mid-point on a post 127 depending downwardly from the sub-plate 25, there being a coil compression spring 128 engaged around the post 127 beneath the lever 126 and retained thereon by means of a circlip 129. A similar coil compression spring 128a and a circlip 129a are provided around the post 113. The end 130 of the lever 126 remote from the post 117 is adapted to engage a shoulder on the control arm lever raising spindle 42.

Referring now to the selector latch 121, the position which this latch occupies so that the lug 122 thereof is positioned for engagement with a desired one of the abutment surfaces 67 is determined by means of the record size selector lever 28 which is connected to a shaft which carries a size selector control lever beneath the deck plate 11. The size selector control lever has a slot in which is engaged a pin carried on a selector control plate 137 slidably and pivotally mounted above the sub-plate 25 by engagement of a headed pin 138 in a slot 139. A pin 140 is carried by the selector control plate 137 and projects through an aperture 141 in the sub-plate 25 for engagement with a part 136 of the selector latch 121. The selector control plate 137 has a roller-like element 142 which can be engaged in one of three notches 143 formed on the end of the sub-plate 25 and a coil tension spring, not shown, is connected between the plate 137 and the sub-plate 25 to urge the roller-like element 142 into engagement with a desired one of the notches 143.

Thus, by movement of the knob 28 the angular position of the control lever 126, and hence of the plate 137, may be adjusted whereby the pin 140 carried on the control plate 137 is moved towards and away from the part 136 of the selector latch 121.

The selector latch 121 carries a cut-out latch 146 mounted for pivotal movement on the selector latch 121 about a pin 147. A coil compression spring, not shown, is engaged between a circlip, not shown, on the pin 147 and the latch 146 to provide a frictional restraint to pivot the latch 146. The cut-out latch 146 has a downwardly extending abutment portion 150 for engagement with a stop lug 151 of the selector latch to limit rotation of the cut-out latch in a clockwise direction in FIG. 1 and hence to locate the cut-out latch 146 in a first position relative to the selector latch 121 during a normal record playing cycle. The downwardly extending abutment portion 150 can also engage with a part 152 provided on the cut-off lever 79 when the cut-out latch 146 is in a second position relative to the selector latch 121 during a "switch-off" cycle of operations.

The cut-out latch 146 has a further downwardly extending lug 153 for engagement with an upwardly extending abutment 134 moulded integrally with the drive line 111, as hereinafter to be described in more detail.

The drive link 111 carries a record feed lever drive peg 154 on its undersurface which is engaged in a longitudinally extending slot 154a in a record feed lever 155 which is slidably and pivotally mounted adjacent its other end 156, on the mounting casting adjacent the underside of the centre spindle, as indicated at 157.

A coil tension spring 155a is connected between a lug 155b on the lever 155 and the peg 154. The lever 155 carries at its other end 156 a center spindle operating cam 158 adapted to overlie a control rod operating member 159 pivotally mounted on a downwardly depending peg 160 which extends through a slot 161 in the lever 155 and is slidably and pivotally received in the mounting casting to mount the lever for said pivotal and sliding movement on the record player. The control rod operating member 159 is provided with a slot 162 adapted to receive a control rod 163 of the umbrella type spindle 26 and to overlie the enlarged head 164 formed thereon. A coil tension spring 165 is connected between the member 159 and the sub-plate 25 to bias the member 159 in an anti-clockwise direction. Carried on the member 159 is a centre spindle retaining clip 166 formed as a moulding in a suitable synthetic plastics material such as nylon and adapted to resiliently grip the control rod above the enlarged head 164 thereof.

The control rod operating member 159 has a latch part 172 for engagement with a latch part 173 pivoted on a trip latch 170 mounted, for pivotal movmeent about a horizontal axis 171, on a trip arm 174. The trip arm 174 is mounted for movement about a horizontal axis on vertically downwardly extending peg 175 provided with a circlip 176 at its outer end, and there being a coil tension spring engaged between the trip arm 174 and the sub-plate so as to bias the arm toward the sub-plate and also to tend to pivot the arm about the peg 175 in the direction to move the end carrying the trip latch 170 toward the sub-plate and also permitting limited vertical movement of the trip arm longitudinally of the peg 175.

The arm 174 at the end opposite to the trip latch 170 is provided with a transversely extending limb 177 having a nose portion 178 for a purpose hereinafter to be described.

Referring particularly to FIG. 2a, the trip latch 170 has an upper end portion which extends through a slot 179 in the sub-plate 25 and a stepped part 180 of the trip latch provides an abutment for engagement with the sub-plate adjacent the end 181 of the slot 179, as hereinafter to be described.

The operation of the record player will now be described during a normal record changing cycle after the playing of at least one record and before the playing of the last of a stack of records.

The cycle will be described starting from a position in which a record is nearing the end of playing. The parts of the record player being in the position shown in FIGS. 1A, 1B and 2. When the record has been played the pick-up of the pick-up head 30 engages in the usual run out track on the record, causing a rapid inward movement of the pick-up arm 29, thus moving the wire 72 longitudinally inwardly to operate the conventional pawl mechanism on the drive gear 45 to engage the teeth therof with the pinion 43 on the turntable, thus starting the gear 45 to rotate in a clockwise direction in FIGS. 1A, 1B and 2.

In order to facilitate description of the record player, reference will be made to various stages of rotation of the drive gear which will be described by the extent of angular rotation of the drive gear 45. It should be appreciated, however, that the specified degrees of rotation are merely approximate to facilitate understanding of the operation of the record player and they are not the precise degrees of rotation at which, in practice, the various stages begin and terminate.

During the first 75° of rotation of the drive gear 45 from the position shown in FIGS. 1A, 1B and 2 the pick-up arm 29 is raised. This is achieved in the following manner.

As the drive gear 45 rotates the drive link 111 is moved to the right in FIGS. 1A and 1B. It will be appreciated that because the link 111 is slidably and pivotally mounted on the selector control pivot post 113 and is pivotally connected to the drive gear 45 the link moves in the manner of a crank shaft.

The components of movement of the link 111 to the left causes the ramp 124 formed on the underside thereof to engage the shoulder on the hereinbefore described boss 125, thereby causing the end of the transfer lever 126 engaged with the post 113 to move downwardly so that the end thereof engaged with the pick-up arm raising spindle 42 is moved upwardly so that the pick-up head 30 is lifted out of engagement with the record.

The coil compression spring engaged between the end 130 of the transfer lever 126 and the selector plate 66 is compressed when the pick-up arm 29 is raised, thus exerting a frictional force on the selector plate 66 to restrain any tendency for pivotal movement thereof, and hence of the pick-up arm 29, about the vertical spindle 31.

Because the transfer lever 126 is mounted on the post 127 with a coil compression spring interposed between the lever 126 and a circlip on the end of the post, if the pick-up arm 29 is accidentally moved downwardly no damage to the mechanism occurs as the downward movement would cause pivoting of the lever 113 about the post 127 with the coil compression spring on the post 127 being compressed to permit this to occur. Between 75° to 140° of rotation of the drive gear 45 from the position shown in FIGS. 1A and 1B and 2 to that shown in FIGS. 3 and 4 the pick-up arm 29 is swung outwardly of the record. This is achieved in the following manner.

The cam surface 47 on the drive gear which is in enngagement with the drive pillar 48 on the selector plate drive lever 51 urges the pillar 48 in a direction outwardly of the drive gear 45, thus pivoting the lever 51 about the pivot post 52. The limb 63 of the fork engages the selector plate drive peg 65 on the selector plate 66 and pivots the selector plate in a clockwise direction from the position shown in FIGS. 1 and 2 to that shown in FIGS. 3 and 4, thus swinging the pick-up arm 29 outwardly of the record.

Because the pivot post 52 is provided in the slot in the drive lever 51 if the pick-up arm 29 is manually moved inwardly thus tending to move the lever 51 in the direction to move the pillar 48 against the cam surface 47, then such movement is permitted as a result of sliding movement of the lever 51 relative to the post 52 against the bias of the spring 57.

Figure 4:
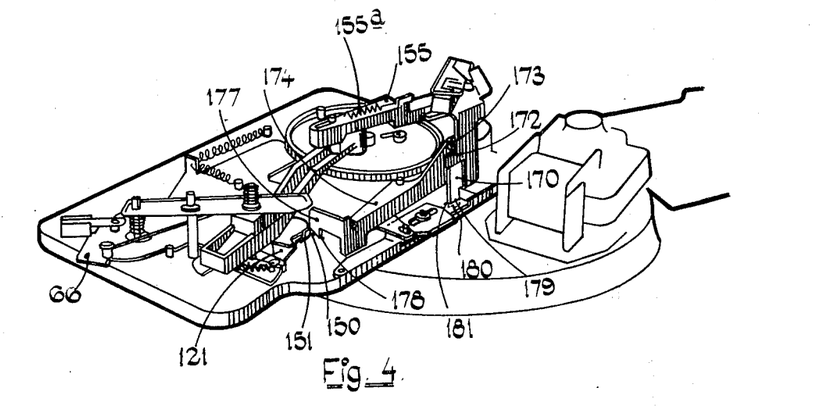
FIG. 4 is a perspective view, with parts omitted, of the record player as shown in FIG. 3.

From 140° to 180° of movement of the drive gear 45 from the position shown in FIGS. 1A, 1B and 2 to that shown in FIGS. 3 and 4 the selector latch 121 is moved into engagement with the selector plate 66 in order to determine the extent of inward movement of the pick-up arm 29, and, during the latter part of this stage, the lowermost record of the stack is dropped onto the turntable 13.

The extent of inward movement of the pick-up arm 29 is determined by selection of the appropriate record size with the manual record size selector lever 28 which moves the selector control lever so that the element 142 is engaged in one of the recesses 143, thus determining the position of the pin 140 for engagement by the abutment part 136 on the selector latch 121. As the pin is moved upwardly in FIGS. 1A and 1B so the extent of pivotal movement of the selector latch 121 in the direction towards the selector plate 66 is reduced and so the positioning of the abutment 122 on the selector latch 121 for engagement with an abutment surface 67 on the selector plate is spaced further from the axis of the rotation thereof, thus permitting progressively further inward movement of the pick-up arm 29.

Movement of the selector latch 121 into position for engagement with the selector plate 66 is achieved by means of engagement of the integral lug 114 on the drive link 11 with the downwardly extending peg 116 provided on the selector drive moulding 117 which rotates the selector drive moulding and thus rotates the selector latch 121 through the spring 118.

As explained hereinbefore, the extent of rotation of the selector latch 121 is determined as a result of engagement of the abutment part 141 of the latch with the pin 140. When inward movement of the selector latch 121 to the extent thus determined is achieved further movement of the drive link 111 is permitted to occur because of extension of the spring 118.

As mentioned above, towards the end of this stage of movement the last record of the stack is dropped onto the turntable or onto a record already on the turntable.

This is achieved as a result of the feed lever drive peg 154 and the drive link 111 moving the feed lever 155 to the right to the position shown in FIGS. 3 and 4 to cause the control rod 163 of the centre spindle 26 to be operated to extend the record supporting fingers of the centre spindle to retain the remaining record or records of the stack above the turntable and to retract the record support arms to permit the lowermost record of the stack to fall onto the turntable 13 or onto the top of a record already on the turntable.

This is achieved as a result of the cam 158 engaging the member 159 and initially causing pivotal movement of the number 159 in a clockwise direction against the bias of the spring 165 to engage the slot 162 around the control rod 163 above the head 164 thereof and to position the latch part 172 for engagement with the latch part 173 of the trip latch 170. When pivotal movement of the member 159 is arrested due to engagement of the end of the slot 162 with the control rod, relative movement occurs between the cam 158 and the member 159 to cause downward movement of the member 159 and thus to cause downward movement of the control rod 163 due to engagement between the member 159 and the head 164. This downward movement causes the record retaining fingers of the centre spindle to be extended and also causes the record supporting arms to be retracted. As described in more detail in our co-pending applications Nos. 3373/73 and 16498/73 the centre spindle is arranged so that the resistance to movement of the control rod under the action of the member 159, as a result of the record retaining fingers engaging the hole in the record or records to be retained, is sufficiently high to prevent further downward movement of the rod under the action of the member 159, thus causing the spring 155a to be stressed and permitting the pin 154 to slide longitudinally towards the right hand end of the slot 154a.

The extent of downward movement of the member 159 is such that the trip latch 170 is carried down by the member 159 insufficiently far for the step 180 thereof to to moved below the slot 179 in the sub-plate 25 and so no latching action of the trip latch occurs and so that the hook part 178 of the trip arm 174 is maintained spaced above, and out of position for engagement with the abutment 151 on the selector latch 121.

From 180° to 285° of rotation of the drive gear 45 from the position shown in FIGS. 3 and 4 the pick-up arm 29 is moved inwardly into position for lowering onto the start of a record. This is achieved in the following way.

The drive pillar 48 which is maintained in engagement with the cam surface 47 by the spring 54 is permitted to move inwardly as a result of engagement with a portion of the cam surface 47 which is spaced closer to the axis pivot of the drive gear 45. Thus, the selector drive lever 51 is pivoted in a clockwise direction about the pivot post 52 under the influence of the spring 54 and thus the limb 64 of the fork engages the peg 65 on the selector plate 66 to pivot the selector plate 66 in an anti-clockwise direction about its axis of rotation 31, thus pivoting the pick-up arm 29 inwardly of the record. This inward movement continues until the abutment 122 on the selector latch 121 engages the predetermined abutment surface 67 depending upon the extent of movement of the latch 121 as described hereinbefore.

When the selector latch 121 is pivoted in an anti-clockwise direction it carries with it the cut-out latch 146 and because the trip arm 174 is maintained in its "at rest" position with the nose 178 spaced above the abutment 151 this inward movement of the cut-out latch is permitted to take place.

In addition, during this phase of rotary movement of the drive gear the drive link 111 starts to move to the left but this far the ramps 124 on the underise thereof are not moved sufficiently to the right for the shouldered boss 125 on the selector control pivot past 113 to be in engagement therewith.

If the selector plate 66 is not to be moved to its innermost position then when the appropriate abutment 67 engages the abutment 122 of the latch plate 121 further pivotal movement of the selector plate 66, and hence of the drive lever 51, will be prevented and thus the pillar 48 will be held out of engagement with the cam surface 47.

From 285° to 305° of the rotation of the drive gear 45 the drive lever 51 is rapidly returned to its neutral position and the pick-up started to be set down onto a record.

The first of these movements is achieved in the first two or three degrees of movement of the drive gear 45 by the pillar 48, being engaged by a portion of the cam surface 47 spaced further from the axis of rotation of the drive gear 45 and so the drive lever 51 is returned rapidly to its neutral position so that the limbs 63 and 64 of the fork are spaced from the pin 65 on the selector plate 66 to permit free tracking of the pick-up arm 29 during playing of the record.

The second of the above movements is achieved due to continued movement of the drive link 111 to the left causing the ramps 124 on the underside thereof to permit the shouldered boss 125 provided on the past 113 to move upwardly, thereby causing the end of the transfer lever 126 in the region of the post 113 to move upwardly so that the end 130 thereof moves downwardly to allow the spindle 42 to move downwardly thereby lowering the pick-up head 30 on to the beginning of a record for playing.

From 305° to 360° of rotation of the drive gear 45 set down of the pick-up arm 29 is completed as a result of continued rotation of the drive gear 45.

In addition, whilst the gear is rotating from the 180° position to the 360° position, the lift lever 155 is returned to its original position, thus permitting upward movement of the member 159 and hence of the control rod 163, and also causing return pivotal movement of the member 159 so that in the "at rest" position of the cam gear only the retaining clip 166 is in engagement with the centre spindle, thereby permitting rapid and convenient removal and if desired re-introduction, or the introduction of a short centre spindle, into the record player merely by pulling the centre spindle vertically upwardly to remove it, and by pushing it vertically downwardly to replace it into the record player.

As the drive gear 45 moves up to the 360° position the pawl mechanism is not operative, and so the drive gear 45 comes to rest in the region where the teeth are omitted therefrom, and the drive gear 45 is held in this position by the notch 50 in the cam surface 47 which is engaged by the roller 49 on the drive lever 51.

The record is then played and the pick-up arm 29 is thus moved gradually inwardly until it reaches the end of playing, whereupon it is again moved rapidly inwardly, causing the wire 72 to again actuate the pawl mechanism to start a further cycle of operations as described hereinbefore.

The manner in which the record player is switched on for the start of playing will now be described with particular reference to FIGS. 1A, 1B and 12.

It will be appreciated that when the record player is first switched on the pick-up arm will be in its outermost position.

The manually operable on/off lever 27 is actuated to pivot the on/off reject plate 104 in a clockwise direction, in FIGS. 1A and 1B, about its axis, thus pivoting the switch lever 100 to cause the pick-up arm clamp to open, due to engagement of the lower end 106 of the clamp lever 107 thereof with the part 105a of the cam surface 105, and also to slide the switch slide 92 in the direction to operate the electric switch 99 to switch on the electric circuit to the record player.

Continued movement of the on/off lever 27 then causes further movement of the switch slide 92 to rotate the cut-off lever 79 about the pin 80 to engage the arm 88 thereof with the pawl mechanism on the drive gear 45 to start the drive gear rotating. The springs 95 and 83 tend to return the mechanism but the spring 83 also urges the cut-off lever 79 towards the pin 87 so that the return movement of the mechanism is arrested when the detent part 86 engages the pin 87 to afford a latching action of the whole mechanism. The cycle then proceeds as described hereinbefore except that the movements to raise and to pivot the pick-up arm 29 outwardly do not have any effect on the pick-up arm 29, as it is already raised and in an outward position, except that the arm 29 is raised slightly off its rest.

The end of playing of a stack of records will now be described.

Figure 5:
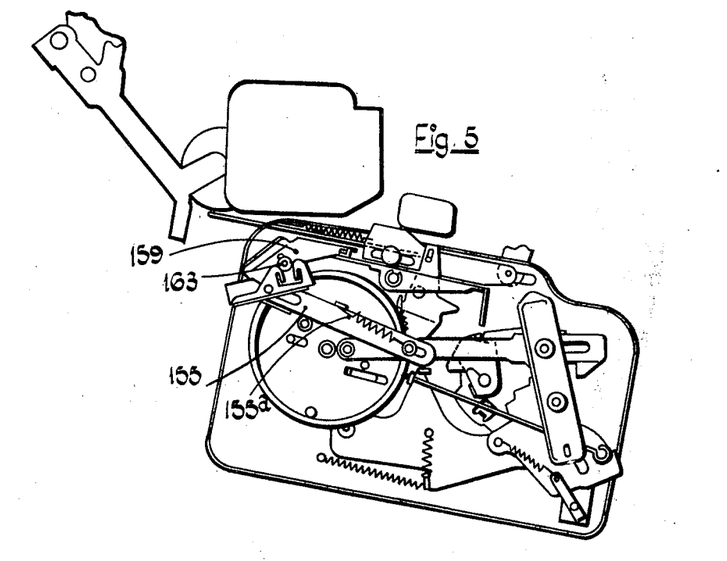
FIG. 5 is an underneath plan view of the record player of FIGS. 1A and 1B showing a third stage of the record changing cycle.
Figure 6:
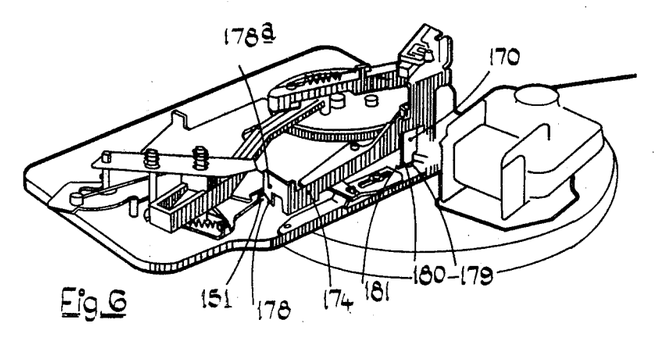
FIG. 6 is a perspective view with parts omitted, of the record player shown in FIG. 5.

The playing of the penultimate record proceeds as described hereinbefore and the cycle at the end of the playing the penultimate record also proceeds as described hereinbefore until the drive gear 45 has moved to approximately the 180° position whereat the last record has just been fed onto the turntable. This position is shown in FIGS. 5 and 6.

In this case, because at the end of playing the penultimate record, there is only one record remaining supported on the spindle, when the record retaining fingers are extended, they do not engage the centre hole of any record and so there is no resistance to their outward movement. Thus, downward movement of the control rod 163 is not resisted and the spring 155a is not overcome and so the cam 158 moves the member 159 further downwardly than hitherto, thus causing the trip latch 170 to be moved downwardly sufficiently for the stepped surface 180 thereof to be spaced below the slot 179 so that the trip latch can pivot about its axis 171 so that the surface 180 will underlie the sub-plate at the end 181 of the slot 179, and the trip arm is pivoted so that the nose part 178 thereof is moved upwardly and held in position ready for engagement with the abutment 151 on the selector latch 121, as hereinafter to be described. It will be appreciated, that as described hereinbefore in connection with a normal cycle of operations, the selector latch has been moved into position for engagement with the selector plate prior to upward movement of the nose portion 178 of the trip arm 174.

The remainder of this cycle of operations then continues as described hereinbefore except that on return movement of the selector latch the abutment 151 snaps under the nose portion 178 of the trip arm, this being permitted by reason of the inclined surface 178a thereof and the spring mounting of the arm on the post 175. In addition, when the control rod is moved upwardly the trip latch is not permitted to move upwardly due to engagement of the stepped surface 180 thereof with the end 181 of the slot 179 so that the nose portion 178 of the trip arm is maintained in engagement with the abutment 151 of the selector latch.

When the last record has been played the pick-up arm again moves rapidly inwardly to cause the wire to operate the pawl mechanism to start a last record changing cycle.

This cycle continues in the normal manner up to the 140° position of the drive gear.

Figure 7:
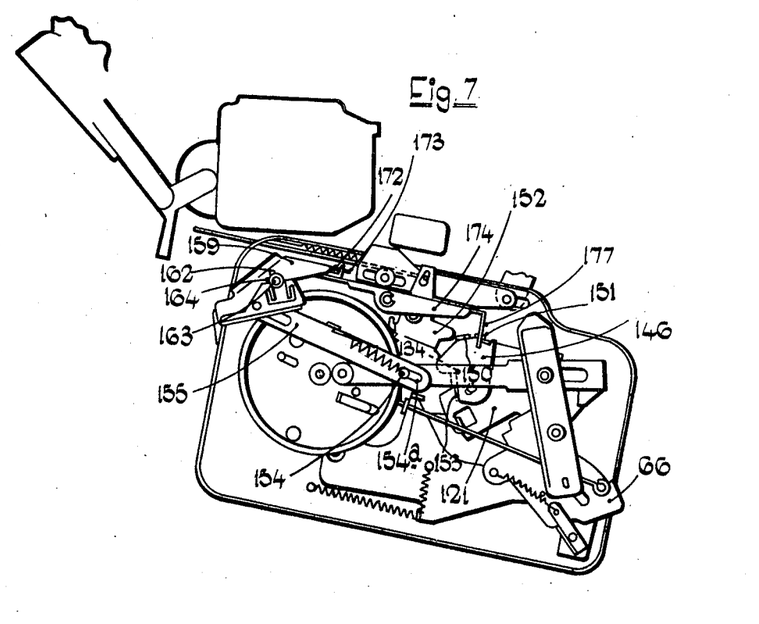
FIG. 7 is an underneath plan view of the record player of FIGS. 1A and 1B showing a fourth stage of the record changing cycle.
Figure 8:
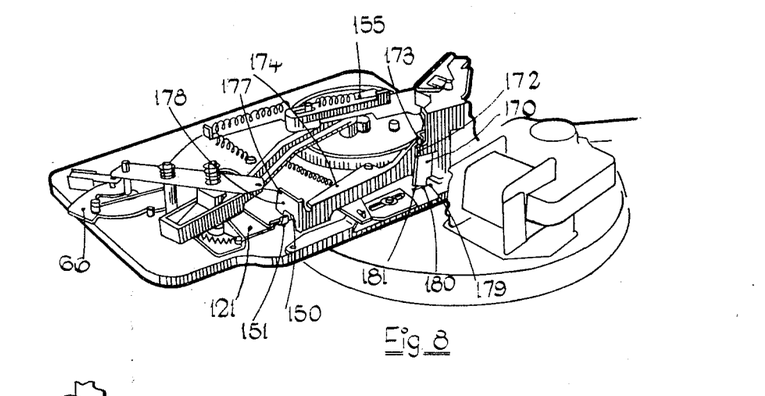
FIG. 8 is a perspective view of the record player shown in FIG. 7.

Continued rotation of the drive gear 45 from this stage to the stage shown in FIGS. 7 and 8 causes the same operations to occur as in a normal cycle except that, as the selector latch 121 is tended to be swung anti-clockwise the movement of the selector latch is arrested in a third position by engagement between the abutment 151 thereof and the nose portion 178 of the trip arm 174 as shown in FIGS. 7 and 8. The selector latch drive moulding 117 is permitted to continue to rotate after arrest of the latch 121 due to elongation of the spring 118.

During the last part of the 145° to 180° stage of movement of the drive gear 45 the centre spindle is again operated but because there is no record thereon this movement is redundant.

Just after the 180° stage, as a result of the selector latch being held in said third position, the abutment 153 of the cut-out latch 146 is engaged by the upwardly extending abutment 134 of the drive link 111 and the cut-out latch is thereby caused to rotate from the first position to the second position mentioned hereinbefore.

During the 180° to 285° phase of movement the selector plate drive lever 51 is tended to pivot in a clockwise direction about the pin 52 to move the pick-up arm 29 inwardly. However, movement of the drive lever 51 in this direction is arrested as a result of engagement between an extension part 51a thereof and a part 121b of the latch plate 121 (see FIGS. 1A and 1B) and no drive is communicated to the selector plate 66 and so the pick-up arm 29 is not moved inwardly.

Figure 9:
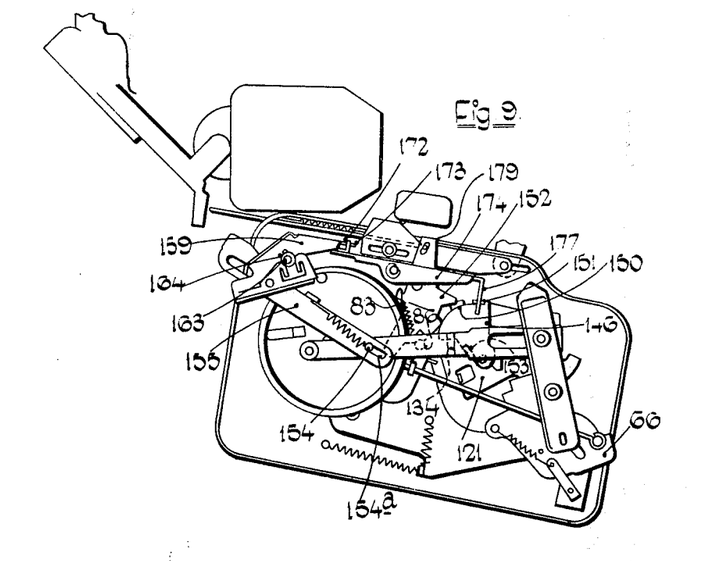
FIG. 9 is an underneath plan view of the record player of FIGS. 1A and 1B showing another stage of the record changing cycle.

From 285° to 360° the pick-up arm 29 is lowered as described hereinbefore, but because it has not been moved inwardly over the record it is lowered onto the rest. At the same time, the selector latch 121 is pivoted in the direction to move the abutment 122 thereof out of the path of movement of the abutments 67 on the selector plate 66, as described hereinbefore, but because the cut-out lever 146 has been moved to the second position described hereinbefore the lug 150 thereof engages with the part 152 of the cut-out lever 79, as shown in FIG. 9, to move it against the bias of the spring 83 to disengage the detent 86 and pin 87 to permit the cut-out lever 79 to rotate under the bias of the springs 83 and 95 to operate the switch 99 to switch off the electric motor 15, to lift the jockey pulley 16 out of engagement with turntable rim 17 and the stepped spindle of the motor 15 by means of the link 91, and also to close the clamp of the rest due to engagement of the lower end 106 of the clamp lever 107 with the part 105b of the cam surface 105, and, in addition, the movement of the slide 92 causes pivotal movement of the trip latch to disengage the surface 180 from the end 181 of the slot 179 to permit the trip latch to move upwardly.

It should be appreciated that the pick-up arm 29 can be moved manually, at any time, over the whole of its range of movement without damage to the mechanism. If the pick-up arm 29 is moved whilst the drive lever 51 is operative to move the pick-up arm 29 inwardly or outwardly then movement of the pick-up arm manually outwardly will cause pivoting of the lever 51 about the post 52 against the bias of the spring 54 to lift the piller 48 off the cam surface 47. Alternatively, if the pick-up arm 29 is pivoted inwardly then the lever 51 will slide laterally as a result of movement of the post 52 within the slot 53 against the bias of the spring 57.

At all other times the lever 51 will be in its neutral position and movement of the pick-up arm over its whole range of movement is permitted because of the spacing between the limbs 63 and 64.

By spacing the lower end of the pick-up arm vertical spindle 31 and the pick-up arm raising spindle 42 from the selector control pivot post 113 and providing the transfer lever 26 for raising and lowering the pick-up arm the lower end of the pick-up arm vertical spindle 17 is relative unobstructed thereby facilitating the provision of ancillary equipment such as, the viscous set-down device and the anti-skate device indicated generally at 161 and 162 respectively in FIG. 2.

The switch off mechanism described above prevents any damage to the mechanism of the on/off lever 27 obstructed during automatic switch off.

It will be appreciated that if only a single record is placed on the centre spindle, then the record player will perform the last two above described cycles of operations each time such a single record is placed on the centre spindle.

If the user does not require the facility of being able to play a stack of records, then instead of using an umbrella type spindle, he can remove the umbrella type spindle by merely pulling it upwardly, as described hereinbefore, and replace it by a short stub spindle. The short stub spindle is not provided with any control rod or any other part for engagement with the member 159 and so the member 159 is not restrained from moving downwardly, so again the record player will perform a switch off cycle of operations and will be automatically switched off at the end of playing of the record. It will be appreciated that in this case the penultimate cycle of operations in which the nose of the trip arm is positioned for engagement with the selector latch on return movement of the selector latch is caused to take place as a result of switching on of the record player manually, whilst the actual cut-off cycle of operations takes place at the end of playing of the record in the usual manner.

If it is desired to replay a record using either an umbrella or stub spindle this can be done merely by operating the one/off switch of the record player to switch on the record player.

Parts of the record player described above are described and claimed in our co-pending application No. 311,637 and our Pat. No. 3,847,401 to which reference may be made for a more detailed description and illustration of said parts.

What we claim then is:

1. An automatic record player for playing disc records of different sizes comprising a deck plate, a motor, a turntable rotatable on the deck plate and driven, in use, by the motor, a centre spindle, extending upwardly from the centre of the turntable, a control member movable within the centre spindle to cause records to be fed singly in succession from the bottom of a stack supported on the spindle on to the turntable, a pick-up arm pivotally mounted for movement about a horizontal axis on the upper end of a vertical spindle, the vertical spindle being pivotally mounted for movement about a vertical axis relative to the deck plate, a drive gear rotatably mounted on the deck plate, means for rotating the drive gear by the motor during a record changing cycle, record change means driven from the drive gear to move the control member and to cause pivotal movement of the pick-up arm about said horizontal axis and of said vertical spindle about said vertical axis, a selector plate provided at the lower end of the vertical spindle, a selector latch mounted on the deck plate, the selector plate and latch having selectively inter-engageable abutments and the selector latch being movable, by said record change means, from a first position, in which free movement of the selector plate is permitted, into a second position for inter-engagement between desired abutments to limit pivotal movement of the selector plate, switch-off means to switch-off the record player, actuating means to actuate said switch-off means comprising a trip latch movable from a first to a second position in dependence upon the resistance to movement of the control member of the centre spindle, the resistance being determined by the presence of at least a predetermined number of records on the spindle, a cut-out latch mounted on the selector latch for movement relative thereto, a trip element, operated when the trip latch is in said second position, to position the selector latch in a third position so that during a last record changing cycle at the end of playing the last record said cut-out latch is in position for engagement with an abutment portion of the record change means so that movement of the abutment portion displaces the cut-out latch so that a portion thereof is moved into position to actuate the switch-off means when the selector latch is moved to said first position by said record change means.

2. A record player according to claim 1 wherein the centre spindle is an umbrella type spindle.

3. A record player according to claim 2 wherein the record player includes a centre spindle control member drive means, said drive means including lost motion means whereby operation of the drive means is permitted to continue when movement of the control member is limited due to the presence of at least said predetermined number of records on the spindle.

4. A record player according to claim 3 wherein the trip latch is connected to a part of the drive means and is movable thereby from said first to said second position, stop means being provided to retain the trip latch in said second position.

5. A record player according to claim 4 wherein said abutment portion is provided on a drive link, one end of which is pivotally connected to the drive gear about an axis spaced from and parallel to, the axis of rotation thereof, the other end of the drive link being mounted relative to the deck plate for sliding movement relative thereto and for pivotal movement about an axis spaced from, and parallel to, the axis of rotation of the drive gear as a result of rotation of the drive gear, and the drive link being operative to raise and lower the pick-up arm on movement of the drive link resulting from rotation of the drive gear and selector latch drive means being provided on the drive link to move the selector latch between said first and second positions.

* * * * *

UNITED STATES PATENT OFFICE
CERTIFICATE OF CORRECTION

PATENT NO. : 3,947,043
DATED      : March 30, 1976
INVENTOR(S) : Philip Henry Evans It is certified that error appears in the above–identified patent and that said Letters Patent are hereby corrected as shown below:

Column 5,  line 19, "level" should be --lever--;

line 54, "133" should be --113--;

Column 6,  line 48, "line" should be --link--;

Column 7,  line 10, "movmeent" should be --movement--;

Column 8,  line 30, "enngagement" should be --engagement--;

Column 9,  line 10, "aboutment" should be --abutment--;

Column 10, line 28, "past" should be --post--;

line 36, delete "the" before "rotation";

line 52, "past" should be --post--;

Column 11, line 43, "of" should be --for--;

line 52, delete "the" after "of"; and Column 14, line 5, "one/off" should be --on/off--.

Signed and Sealed this

Twentieth Day of July 1976

[SEAL]

Attest:

RUTH C. MASON
*Attesting Officer*

C. MARSHALL DANN
*Commissioner of Patents and Trademarks*